US012190800B2

(12) United States Patent
Wu et al.

(10) Patent No.: US 12,190,800 B2
(45) Date of Patent: Jan. 7, 2025

(54) DISPLAY CONTROLLER, DISPLAY DEVICE, DISPLAY SYSTEM, AND CONTROL METHOD

(71) Applicant: BOE TECHNOLOGY GROUP CO., LTD., Beijing (CN)

(72) Inventors: Baoyun Wu, Beijing (CN); Yang Yu, Beijing (CN); Yuanzhang Zhu, Beijing (CN); Xuesong Tian, Beijing (CN); Xinbin Han, Beijing (CN); Shiming Shi, Beijing (CN); Hui Zhao, Beijing (CN); Hualing Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,047

(22) PCT Filed: May 31, 2022

(86) PCT No.: PCT/CN2022/096429

§ 371 (c)(1),
(2) Date: Mar. 21, 2023

(87) PCT Pub. No.: WO2023/230903

PCT Pub. Date: Dec. 7, 2023

(65) Prior Publication Data

US 2024/0233631 A1 Jul. 11, 2024

(51) Int. Cl.

| | |
|---|---|
| ***G09G 3/3225*** | (2016.01) |
| ***G09G 3/20*** | (2006.01) |
| ***G09G 3/3266*** | (2016.01) |

(52) U.S. Cl.
CPC ......... *G09G 3/3225* (2013.01); *G09G 3/2092* (2013.01); *G09G 3/3266* (2013.01);
(Continued)

(58) Field of Classification Search
CPC ......... G09G 3/3233; G09G 2340/0435; G09G 2300/0819; G09G 2300/0842;
(Continued)

(56) References Cited

U.S. PATENT DOCUMENTS 10,565,963 B2 2/2020 Kim et al.
10,657,862 B2 5/2020 Zhang
(Continued)

FOREIGN PATENT DOCUMENTS

CN 105096796 A 11/2015
CN 106205460 A 12/2016
(Continued)

*Primary Examiner* — Dismery Mercedes
(74) *Attorney, Agent, or Firm* — Westman, Champlin & Koehler, P.A.

(57) ABSTRACT

A display controller, a display device, a display system, and a control method are provided. The display controller includes: a flag-signal circuit configured to send a flag-signal to an application processor; an image processing circuit configured to obtain second current image data in response to receiving first current image data from the application processor, wherein the first current image data is sent by the application processor in response to receiving the flag-signal sent from the flag-signal circuit; and a drive circuit configured to generate a first drive control signal in response to receiving the second current image data from the image processing circuit.

18 Claims, 10 Drawing Sheets

(52) U.S. Cl.
CPC ............... *G09G 2300/0819* (2013.01); *G09G 2300/0842* (2013.01); *G09G 2310/08* (2013.01); *G09G 2320/0252* (2013.01); *G09G 2340/0435* (2013.01); *G09G 2370/00* (2013.01)

(58) Field of Classification Search
CPC ............. G09G 2310/08; G09G 3/3266; G09G 3/3225; G09G 2330/028; G09G 3/2946; G06F 1/022
See application file for complete search history.

(56) References Cited

U.S. PATENT DOCUMENTS

| | | | | |
|---|---|---|---|---|
| 10,997,926 | B2 * | 5/2021 | Park | G09G 3/3275 |
| 11,017,723 | B2 | 5/2021 | Lee et al. | |
| 11,127,335 | B2 * | 9/2021 | Ahn | G09G 3/2044 |
| 11,170,704 | B2 | 11/2021 | An et al. | |
| 11,270,667 | B2 | 3/2022 | Kim et al. | |
| 11,380,268 | B2 | 7/2022 | Park et al. | |
| 11,462,169 | B2 | 10/2022 | Lee et al. | |
| 11,551,642 | B2 * | 1/2023 | Kim | G09G 5/12 |
| 11,568,825 | B2 | 1/2023 | Zhang et al. | |
| 2015/0340014 | A1 | 11/2015 | Kim et al. | |
| 2016/0104414 | A1 | 4/2016 | Pyun et al. | |
| 2017/0061847 | A1 * | 3/2017 | Kim | G09G 3/3607 |
| 2017/0294169 | A1 * | 10/2017 | Lee | G09G 3/3688 |
| 2018/0277061 | A1 * | 9/2018 | Lee | G09G 5/363 |
| 2019/0005862 | A1 | 1/2019 | Zhang | |
| 2020/0035184 | A1 * | 1/2020 | Luo | G09G 3/3677 |
| 2020/0152155 | A1 | 5/2020 | Kim et al. | |
| 2020/0211475 | A1 | 7/2020 | Park et al. | |
| 2021/0035488 | A1 * | 2/2021 | Seo | G09G 3/2092 |
| 2021/0049967 | A1 | 2/2021 | Zhang et al. | |
| 2021/0089188 | A1 * | 3/2021 | Lin | G09G 3/20 |
| 2021/0097930 | A1 | 4/2021 | An et al. | |
| 2021/0110771 | A1 | 4/2021 | Lee et al. | |
| 2021/0248958 | A1 | 8/2021 | Park et al. | |
| 2021/0256911 | A1 | 8/2021 | Lee et al. | |
| 2021/0287605 | A1 | 9/2021 | Wang et al. | |
| 2022/0059025 | A1 | 2/2022 | An et al. | |
| 2022/0189434 | A1 | 6/2022 | Kim et al. | |
| 2022/0301479 | A1 * | 9/2022 | Kim | G09G 5/06 |
| 2022/0351679 | A1 | 11/2022 | Yang et al. | |
| 2023/0162691 | A1 | 5/2023 | Zhang et al. | |
| 2023/0178049 | A1 * | 6/2023 | Lim | G09G 3/3677 345/87 |

FOREIGN PATENT DOCUMENTS

| | | | |
|---|---|---|---|
| CN | 110310600 | A | 10/2019 |
| CN | 110867162 | A | 3/2020 |
| CN | 109272931 | B | 6/2020 |
| CN | 111383594 | A | 7/2020 |
| CN | 111862890 | A | 10/2020 |
| CN | 111968582 | A | 11/2020 |
| CN | 112116893 | A | 12/2020 |
| CN | 112581907 | A | 3/2021 |
| CN | 112735330 | A | 4/2021 |
| CN | 113160747 | A | 7/2021 |
| CN | 113160748 | A | 7/2021 |
| CN | 113593481 | A | 11/2021 |
| CN | 113608713 | A | 11/2021 |
| CN | 113990244 | A | 1/2022 |
| KR | 20210082865 | A | 7/2021 |

* cited by examiner

DISPLAY CONTROLLER, DISPLAY DEVICE, DISPLAY SYSTEM, AND CONTROL METHOD

CROSS REFERENCE TO RELATED APPLICATION(S)

This application is a National Stage Application of International Application No. PCT/CN2022/096429, filed on May 31, 2022, entitled "DISPLAY CONTROLLER, DISPLAY DEVICE, DISPLAY SYSTEM, AND CONTROL METHOD", the entire content of which is incorporated herein by reference in its entirety.

TECHNICAL FIELD

The present disclosure relates to a field of a display technology, and in particular, to a display controller, a display device, a display system, and a control method.

BACKGROUND

With a development of an information science technology, a display technology has also been developed. The display technology based on an Organic Electroluminescence Display (OLED) has characteristics of a self-illumination, a wide viewing angle, a fast response, a bendability, a flexibility, etc., which is an important breakthrough in the field of the display technology and improves a visual effect.

With an application of an LTPO (Low-Temperature Polycrystalline Oxide) technology in the display technology based on the OLED, a display frequency of a display module may extend to an ultra-low display frequency while achieving a high display frequency, so that the display module needs to support more and more display frequencies.

SUMMARY

In view of this, the present disclosure provides a display controller, a display device, a display system, and a control method.

An aspect of the present disclosure provides a display controller, including:

a flag-signal circuit configured to send a flag-signal to an application processor:

an image processing circuit configured to obtain second current image data in response to receiving first current image data from the application processor, wherein the first current image data is sent by the application processor in response to receiving the flag-signal sent from the flag-signal circuit; and a drive circuit configured to generate a first drive control signal in response to receiving the second current image data from the image processing circuit.

For example, the flag-signal circuit is configured to send the flag-signal loaded with a first pulse signal to the application processor, wherein the flag-signal loaded with the first pulse signal is configured to indicate that the application processor is allowed to send the first current image data to the image processing circuit; and the image processing circuit is configured to obtain, according to the first current image data, the second current image data in response to receiving the first current image data from the application processor, wherein the first current image data is sent by the application processor in response to receiving the flag-signal loaded with the first pulse signal, which is sent from the flag-signal circuit.

For example, the first drive control signal includes a scan start signal loaded with a second pulse signal:

the drive circuit is configured to generate the scan start signal loaded with the second pulse signal in response to detecting that previous image data from the application processor is processed; and the flag-signal circuit is configured to generate the flag-signal loaded with the first pulse signal in response to receiving the scan start signal loaded with the second pulse signal from the drive circuit.

For example, a change frequency of the flag-signal loaded with the first pulse signal is consistent with a change frequency of the scan start signal; and a response speed of a display module is consistent with the change frequency of the scan start signal.

For example, the drive circuit is configured to adjust a change frequency of the first drive control signal according to an image data transmission frequency of the application processor, so as to obtain a second drive control signal, wherein the second drive control signal is configured to drive a sub-pixel circuit to display display data, and a change frequency of the second drive control signal is matched with the image data transmission frequency.

For example, the drive circuit is configured to adjust, in response to determining that a current display frequency is not matched with the image data transmission frequency, the change frequency of the first drive control signal according to the image data transmission frequency, so as to obtain the second drive control signal.

For example, the drive circuit is configured to increase, in response to determining that the current display frequency is less than the image data transmission frequency, the change frequency of the first drive control signal according to the image data transmission frequency, so as to obtain the second drive control signal.

For example, the drive circuit is configured to reduce, in response to determining that the current display frequency is greater than the image data transmission frequency, the change frequency of the first drive control signal according to the image data transmission frequency, so as to obtain the second drive control signal.

For example, the drive circuit is configured to determine display frequency adjustment information in response to receiving a first display frequency adjustment request from the application processor, and adjust a change frequency of the first drive control signal according to the display frequency adjustment information to obtain a third drive control signal, wherein the third drive control signal is configured to drive a sub-pixel circuit to display display data.

For example, the display frequency adjustment information includes a first display frequency range corresponding to a current application, and the first display frequency range is determined by the application processor according to attribute information of the current application.

For example, the display frequency adjustment information includes a preset second display frequency range.

For example, the first drive control signal is configured to drive a sub-pixel circuit included in a display module to display display data, wherein the display data is determined according to the second current image data, and a current response speed of the display module is N times of a current display frequency of the display module, wherein N is an integer greater than or equal to 1

Another aspect of the present disclosure provides a display device, including:

the display controller according to the present disclosure; and a display module connected to the display controller, wherein the display module is configured to display display data according to a drive control signal provided by the display controller, wherein the display data is determined according to the second current image data.

For example, the above-mentioned display module includes:

a sub-pixel circuit;

a gate drive circuit connected to the display controller and the sub-pixel circuit, wherein the gate drive circuit is configured to provide a scan start signal, a gate drive signal and a reset signal to the sub-pixel circuit according to the first drive control signal sent by the display controller; and a source drive circuit connected to the display controller and the sub-pixel circuit, wherein the source drive circuit is configured to provide a data signal to the sub-pixel circuit according to the first drive control signal sent by the display controller, wherein the gate drive signal, the reset signal, and the data signal are configured to drive the sub-pixel circuit to display the display data.

For example, a change frequency of the scan start signal is configured as an anode reset frequency of the sub-pixel circuit.

Another aspect of the present disclosure provides a display system, including:

the display device according to the present disclosure; and an application processor configured to send the first current image data to the image processing circuit in response to receiving the flag-signal from the flag-signal circuit.

For example, the application processor is configured to send a display frequency adjustment request to the drive circuit, so that the drive circuit determines a display frequency adjustment information in response to receiving the display frequency adjustment request from the application processor, and adjusts a change frequency of the first drive control signal according to the display frequency adjustment information to obtain a third drive control signal, wherein the third drive control signal is configured to drive a sub-pixel circuit to display the display data.

For example, the display frequency adjustment information includes a first display frequency range corresponding to a current application, and the first display frequency range is determined by the application processor according to attribute information of the current application.

For example, the display frequency adjustment information includes a preset second display frequency range.

Another aspect of the present disclosure provides a control method applied to the display controller according to the present disclosure, including:

sending, by the flag-signal circuit, the flag-signal to the application processor;

obtaining, by the image processing circuit, the second current image data in response to receiving the first current image data from the application processor, wherein the first current image data is sent by the application processor in response to receiving the flag-signal sent from the flag-signal circuit; and generating, by the drive circuit, the first drive control signal in response to receiving the second current image data from the image processing circuit.

BRIEF DESCRIPTION OF THE DRAWINGS

The above and other objectives, features, and advantages of the present disclosure will be clearer through the following description of embodiments of the present disclosure with reference to accompanying drawings, in which.

DETAILED DESCRIPTION OF EMBODIMENTS

Embodiments of the present disclosure will be described below with reference to the accompanying drawings. It should be understood, however, that these descriptions are merely exemplary and are not intended to limit the scope of the present disclosure. In the following detailed descriptions, for the convenience of explanation, many specific details are described to provide a comprehensive understanding of embodiments of the present disclosure. However, it is obvious that one or more embodiments may also be implemented without these specific details. In addition, in the following descriptions, descriptions of well-known structures and technologies are omitted to avoid unnecessarily obscuring the concept of the present disclosure.

Terms used herein are only intended to describe specific embodiments and are not intended to limit the present disclosure. Terms "include", "contain", etc. used herein indicate the presence of the described features, steps, operations and/or components, but do not exclude the presence or addition of one or more other features, steps, operations and/or components.

All terms (including technical and scientific terms) used herein have meanings generally understood by those skilled in the art, unless otherwise defined. It should be noted that the terms used herein should be interpreted as having the meaning consistent with the context of the present disclosure, and should not be interpreted in an idealized or overly rigid manner.

In a case that an expression similar to "at least one of A, B, and C" is used, the expression should generally be interpreted according to the meaning of the expression generally understood by those skilled in the art (for example, "a system having at least one of A, B, and C" shall include, but is not limited to, a system having A alone, having B alone, having C alone, having A and B, having A and C, having B and C, and/or having A, B and C, etc.). In a case that an expression similar to "at least one of A, B or C" is used, the expression should generally be interpreted according to the meaning of the expression generally understood by those skilled in the art (for example, "a system having at least one of A, B or C" shall include, but is not limited to, a system having A alone, having B alone, having C alone, having A and B, having A and C, having B and C, and/or having A, B and C, etc.).

Figure 1A:
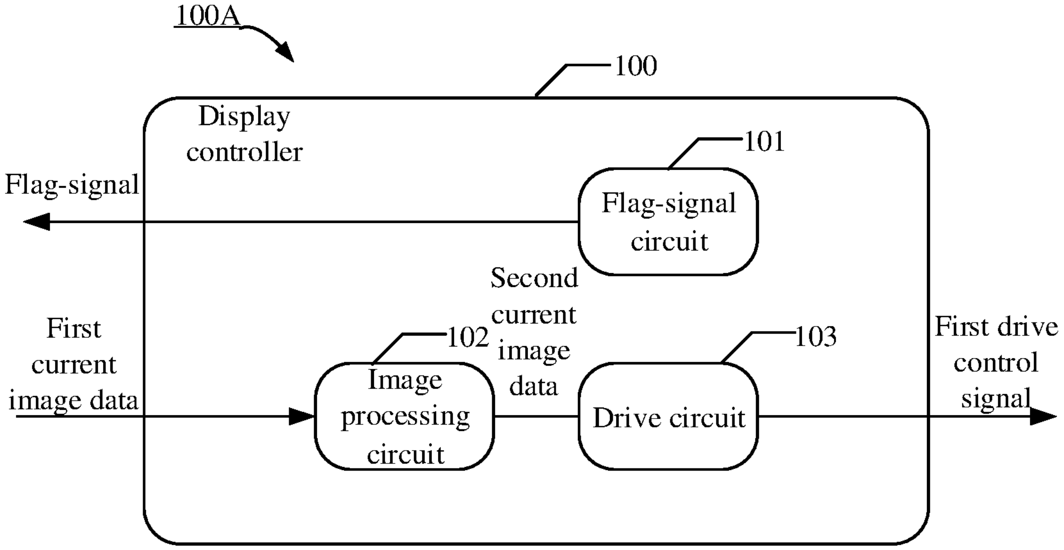
FIG. 1A schematically shows a block diagram of a display controller according to an embodiment of the present disclosure.

FIG. 1A schematically shows a block diagram of a display controller according to an embodiment of the present disclosure.

As shown in FIG. 1A, in 100A, a display controller (e.g., Display Driver Integrated Circuit, DDIC) 100 may include a flag-signal circuit 101, an image processing circuit 102 and a drive circuit 103. The drive circuit 103 may be connected to the flag-signal circuit 101 and the image processing circuit 102.

The flag-signal circuit 101 may send a flag-signal to an application processor (AP).

The image processing circuit 102 may obtain second current image data in response to receiving first current image data from the application processor. The first current image data may be sent by the application processor in response to receiving the flag-signal sent from the flag-signal circuit 101.

The drive circuit 103 may generate a first drive control signal in response to receiving the second current image data from the image processing circuit 102.

According to embodiments of the present disclosure, the flag-signal may be used to indicate a data processing stage of the display controller. The data processing stage may include at least one of: a being-processed stage and a data holding stage. The being-processed stage may refer to a stage from receiving the first current image data from the application processor to generating the first drive control signal by the display controller. The data holding stage may refer to a stage of maintaining the first current image data. The flag-signal may be a flag-signal with a variable frequency. The flag-signal with the variable frequency may mean that the flag-signal has a corresponding change frequency in each data processing stage. For example, when the data processing stage is the being-processed stage, the change frequency of the flag-signal may be 120 Hz. In the data holding stage, the change frequency of the flag-signal may be 240 Hz.

According to embodiments of the present disclosure, the first current image data may be image data currently received by the display controller from the application processor. The second current image data may be image data obtained by processing the first current image data by the image processing circuit. The first drive control signal may be used to drive a sub-pixel circuit included in a display module to display display data. The display data may be determined according to the second current image data. The first drive control signal may include at least one of: a scan start (e.g., Scan Start Vertical, Scan STV) signal, a gate drive (i.e., Gate STV) signal, a reset (i.e., Reset STV) signal, a light-emitting (i.e., EM STV) signal and a data signal. The scan start signal may be used to drive a Scan GOA (Gate driver On Array) in the sub-pixel circuit. The gate drive signal may be used to drive a Gate GOA in the sub-pixel circuit. The reset signal may be used to drive a Reset GOA in the sub-pixel circuit. The light-emitting signal may be used to drive an EM GOA in the sub-pixel circuit.

According to embodiments of the present disclosure, the image processing circuit may include at least one of: a decoder, a memory, a rendering circuit and a compensation circuit. A plurality of memories may be provided. For example, the plurality of memories may include a frame buffer and other memories. The decoder may be respectively connected to the frame buffer and the rendering circuit. The compensation circuit may be respectively connected to the rendering circuit and other memories. The frame buffer may be used to store third current image data. The third current image data may refer to encoded first current image data. The decoder may be used to decode received third current image data to obtain fourth current image data. The fourth current image data may refer to decoded third current image data. The rendering circuit may be used to render received fourth current image data to obtain fifth current image data. Other memories may be used to store compensation data. The compensation circuit may be used to compensate the fifth current image data based on the compensation data in other memories to obtain the second current image data.

According to embodiments of the present disclosure, the application processor may send the first current image data to the image processing circuit in response to receiving the flag-signal sent from the flag-signal circuit. The image processing circuit may process the first current image data to obtain the second current image data. The image processing circuit sends the second current image data to the drive circuit. The drive circuit may generate the first drive control signal according to the second current image data. The first drive control signal may be used to drive the sub-pixel circuit in the display module to display the display data. The display data may be obtained according to the second current image data.

Figure 1B:
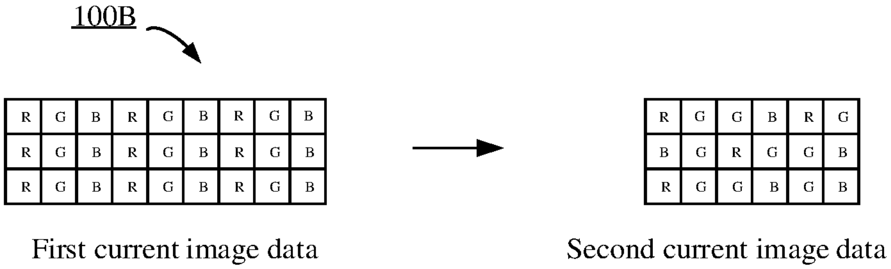
FIG. 1B schematically shows an exemplary schematic diagram of first current image data and second current image data according to an embodiment of the present disclosure.

FIG. 1B schematically shows an exemplary schematic diagram of first current image data and second current image data according to embodiments of the present disclosure.

As shown in FIG. 1B, in 100B, a size of the first current image data may be 9×3. A size of the second current image data may be 6×3. In addition, a pixel value of the first current image data is different from a pixel value of the second current image data. In FIG. 1B, R represents Red, G represents Green, and B represents Blue.

According to embodiments of the present disclosure, the flag-signal is sent to the application processor through the flag-signal circuit. The flag-signal is used to indicate that the application processor is allowed to send the first current image data to the image processing circuit, which may improve a response speed of the application processor.

According to embodiments of the present disclosure, the first drive control signal may be used to drive the sub-pixel circuit included in the display module to display the display data. The display data may be determined according to the second current image data. A current response speed of the display module is N times of a current display frequency of the display module. N may be an integer greater than or equal to 1.

According to embodiments of the present disclosure, determining the display data according to the second current image data may include: determining the second current image data as the display data. Alternatively, the second current image data may be processed to obtain the display data.

According to embodiments of the present disclosure, a response speed of the display module may refer to a speed at which the display module refreshes a display interface in response to a user operation. A display frequency of the display module may refer to a refresh rate of the display module, that is, the number of times the display module refreshes the display interface per second. The response speed of the display module may be independent of the display frequency of the display module. The response speed of the display module may be determined according to a change frequency of the scan start signal. Since the change frequency of the scan start signal may be N times of the display frequency of the display module, the response speed of the display module may be N times of the display frequency of the display module. For the current response speed and the current display frequency, the current response speed of the display module may be N times of the current display frequency of the display module. N may be an integer greater than or equal to 1. For example, the current response speed of the display module may be 240 Hz. The current display frequency of the display module may be 240/N Hz. Alternatively, the current response speed of the display module may be 360 Hz. The current display frequency of the display module may be 360/N Hz. A value of N may be configured according to actual business needs, which will not be limited here. For example, N may be one of: 1, 2, 3, 4, . . . .

According to embodiments of the present disclosure, the current response speed of the display module may be N times of the current display frequency of the display module through an internal data processing method of the display controller. The current response speed is no longer limited to the current display frequency, thereby improving the current response speed. Due to an improvement of the current response speed, a granularity of a frequency change of the display frequency may be refined, so that the display module may share a group of Gammas at a plurality of current display frequencies, thereby reducing a production cost. In addition, since the application processor does not need to adapt to display modules of the plurality of current display frequencies, an adaptation difficulty of the application processor may be reduced. The granularity of the frequency change may refer to a maximum interval between display frequencies that may be supported by the display module.

According to embodiments of the present disclosure, the flag-signal circuit 101 may send the flag-signal loaded with a first pulse signal to the application processor. The flag-signal loaded with the first pulse signal may be used to indicate that the application processor is allowed to send the first current image data to the image processing circuit 102.

The image processing circuit 102 may obtain the second current image data according to the first current image data in response to receiving the first current image data from the application processor. The first current image data may be sent by the application processor in response to receiving the flag-signal loaded with the first pulse signal, which is sent from the flag-signal circuit 101.

According to embodiments of the present disclosure, the flag-signal loaded with the first pulse signal may be used to indicate that the application processor is allowed to send the first current image data to the image processing circuit 102. That is, when the application processor receives the flag-signal loaded with the first pulse signal from the flag-signal circuit 101, if the application processor needs to send the first current image data to the image processing circuit 102, the application processor may be allowed to send the first current image data. When the application processor receives a flag-signal, which is not loaded with the first pulse signal, sent from the flag-signal circuit 101, if the application processor needs to send the first current image data to the image processing circuit 102, the application processor may not be allowed to send the first current image data.

According to embodiments of the present disclosure, a form of the first pulse signal may be configured according to actual business needs, which will not be limited here. For example, the first pulse signal may be a positive pulse signal.

Figure 2A:
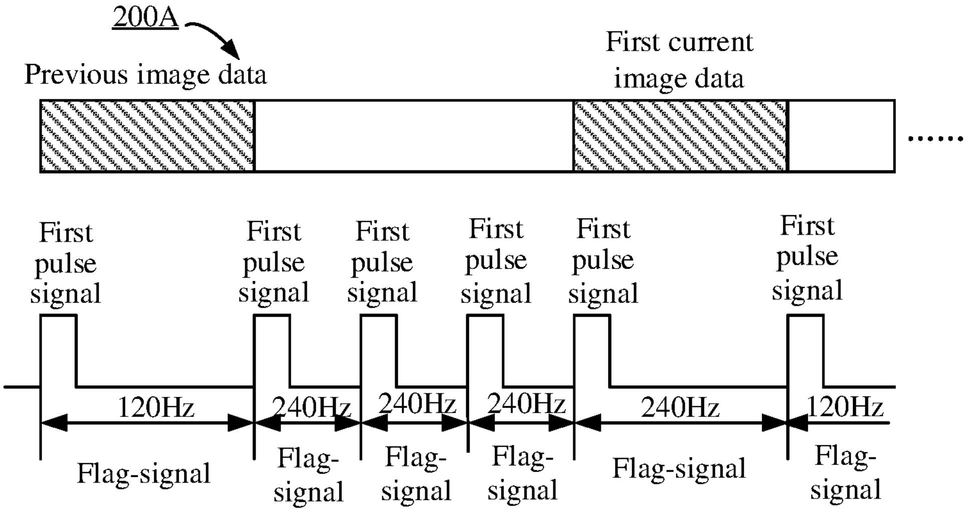
FIG. 2A schematically shows an exemplary schematic diagram of a working process of a flag-signal according to an embodiment of the present disclosure.

FIG. 2A schematically shows an exemplary schematic diagram of a working process of a flag-signal according to embodiments of the present disclosure.

As shown in FIG. 2A, in 200A, the flag-signal is a flag-signal with a variable frequency. When the data processing stage is the being-processed stage, the change frequency of the flag-signal is 120 Hz. In the data holding stage, the change frequency of the flag-signal is 240 Hz. The flag-signal loaded with the first pulse signal may be used to indicate that the application processor is allowed to send image data to the image processing circuit.

When the application processor receives the flag-signal loaded with the first pulse signal from the flag-signal circuit, if the application processor needs to send previous image data to the image processing circuit, the application processor is allowed to send the previous image data. When the application processor receives the flag-signal, which is not loaded with the first pulse signal, sent from the flag-signal circuit, if the application processor needs to send the first current image data to the image processing circuit, the application processor is not allowed to send the first current image data. The application processor may send the first current image data to the image processing circuit when the application processor receives the flag-signal loaded with the first pulse signal, which is sent from the flag circuit.

According to embodiments of the present disclosure, the flag-signal loaded with the first pulse signal is sent to the application processor through the flag-signal circuit. The flag-signal loaded with the first pulse signal is used to indicate that the application processor is allowed to send the first current image data to the image processing circuit, which may improve the response speed of the application processor. In addition, the being-processing stage and the data holding stage may be separated to allow the application processor to update the image data in time in the data holding stage according to an indication of the flag-signal.

According to embodiments of the present disclosure, the first drive control signal may include a scan start signal loaded with a second pulse signal.

The drive circuit 103 may generate the scan start signal loaded with the second pulse signal in response to detecting that previous image data from the application processor is processed.

The flag-signal circuit 101 may generate the flag-signal loaded with the first pulse signal in response to receiving the scan start signal loaded with the second pulse signal from the drive circuit 103.

According to embodiments of the present disclosure, a form of the second pulse signal may be configured according to actual business needs, which will not be limited here. The form of the second pulse signal may be different from the form of the first pulse signal. For example, the second pulse signal may be a negative pulse signal. The first pulse signal may be a positive pulse signal. A pulse width of the second pulse signal is different from a pulse width of the first pulse signal.

According to embodiments of the present disclosure, the scan start signal may be used to drive the Scan GOA in the sub-pixel circuit. The drive circuit 103 may determine whether the previous image data is processed in response to receiving the previous image data from the application processor. When it is determined that the previous image data is processed, the drive circuit may generate the scan start signal loaded with the second pulse signal. Whether the previous image data is processed may include one of: whether the previous image data is being processed and has not been processed, and whether the previous image data has been processed. For example, the drive circuit 103 may generate the scan start signal loaded with the second pulse signal when it is determined that the previous image data has been processed.

According to embodiments of the present disclosure, the drive circuit 103 may send the scan start signal loaded with the second pulse signal to the flag-signal circuit 101. The flag-signal circuit 101 may generate the flag-signal loaded with the first pulse signal in response to receiving the scan start signal loaded with the second pulse signal.

According to embodiments of the present disclosure, a change frequency of the flag-signal loaded with the first pulse signal may be consistent with the change frequency of the scan start signal. The current response speed of the display module may be consistent with the change frequency of the scan start signal.

According to embodiments of the present disclosure, for example, the change frequency of the scan start signal may be 240 Hz. The change frequency of the flag-signal loaded with the first pulse signal may be 240 Hz, that is, the flag-signal loaded with the first pulse signal may be generated every 240 Hz. The current response speed of the display module may also be 240 Hz. If the change frequency of the scan start signal is increased to 360 Hz, the change frequency of the flag-signal loaded with the first pulse signal and the current response speed of the display module may also reach 360 Hz.

Figure 2B:
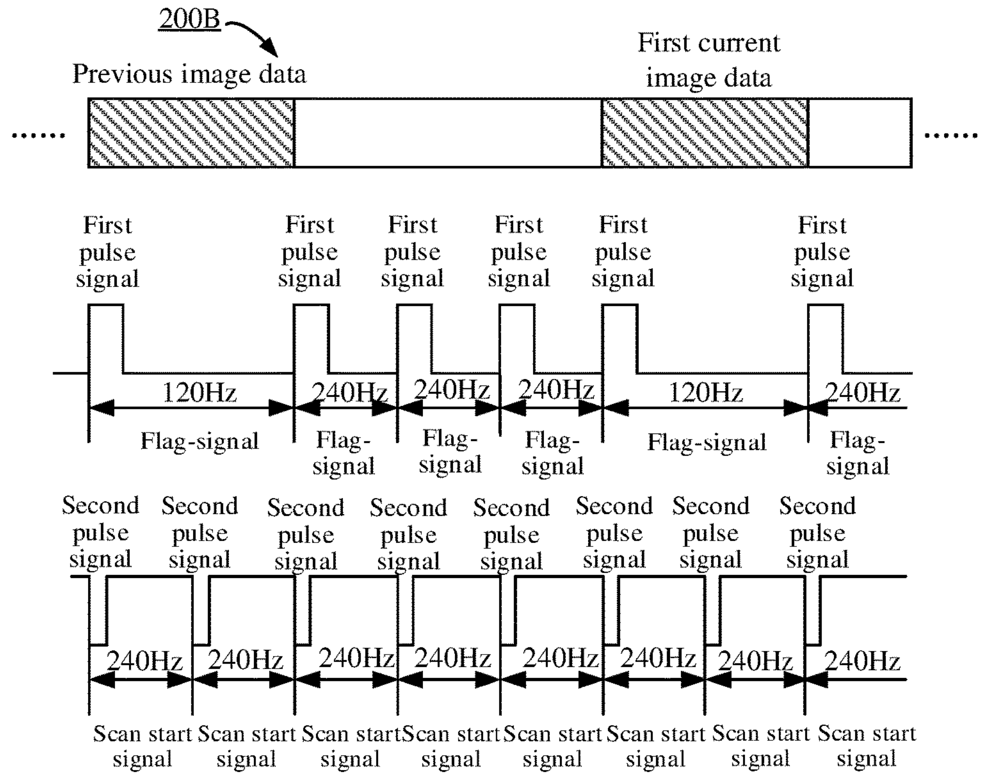
FIG. 2B schematically shows an exemplary schematic diagram of a working process of a flag-signal according to another embodiment of the present disclosure.

FIG. 2B schematically shows an exemplary schematic diagram of a working process of a flag-signal according to another embodiment of the present disclosure.

As shown in FIG. 2B, in 200B, the change frequency of the scan start signal is 240 Hz. The change frequency of the flag-signal loaded with the first pulse signal is consistent with the change frequency of the scan start signal.

When it is determined that the previous image data has been processed, the drive circuit may generate the scan start signal loaded with the second pulse signal in response to receiving the previous image data from the application processor. The flag-signal circuit may generate the flag-signal loaded with the first pulse signal in response to receiving the scan start signal loaded with the second pulse signal from the drive circuit.

When the application processor receives the flag-signal loaded with the first pulse signal from the flag-signal circuit, if the application processor needs to send the previous image data to the image processing circuit, the application processor is allowed to send the previous image data. When the application processor receives the flag-signal, which is not loaded with the first pulse signal, sent from the flag-signal circuit, if the application processor needs to send the first current image data to the image processing circuit, the application processor is not allowed to send the first current image data. The application processor may send the first current image data to the image processing circuit when the application processor receives the flag-signal loaded with the first pulse signal, which is sent from the flag circuit.

According to embodiments of the present disclosure, when the current response speed of the display module is independent of the current display frequency, the current response speed may be N times of the current display frequency, which may improve the current response speed. Accordingly, the granularity of the frequency change of the display frequency may be refined, so that the display module may share a group of Gammas at the plurality of current display frequencies, thereby reducing the production cost. In addition, since the application processor does not need to adapt to the display modules of the plurality of current display frequencies, the adaptation difficulty of the application processor may be reduced.

According to embodiments of the present disclosure, the drive circuit 103 may adjust a change frequency of the first drive control signal according to an image data transmission frequency, so as to obtain a second drive control signal. The second drive control signal may be used to drive the sub-pixel circuit to display the display data. A change frequency of the second drive control signal may be matched with the image data transmission frequency.

According to embodiments of the present disclosure, the display controller 100 may adjust a display frequency of the sub-pixel circuit according to an image transmission frequency of the application processor. The image transmission frequency may be determined according to a reception time interval between adjacent predetermined number of image data. For example, the predetermined number may be two. Two adjacent image data may include the first current image data and the previous image data. The drive circuit 103 may determine a reception time interval between the first current image data and the previous image data according to a reception time of the first current image data and a reception time of the previous image data. The image transmission frequency is determined according to the reception time interval between the first current image data and the previous image data. It should be noted that the first current image data and the previous image data may change with time.

According to embodiments of the present disclosure, the change frequency of the second drive control signal being matched with the image data transmission frequency may mean that the change frequency of the second drive control signal may be greater than or equal to the image data transmission frequency. In this case, if the change frequency of the second drive control signal is greater than the image data transmission frequency, the change frequency of the second drive control signal may be a target candidate change frequency with a lowest absolute value of a difference value between the target candidate change frequency and the image data transmission frequency in a set of candidate change frequencies. The set of candidate change frequencies may be determined according to the change frequency of the scan start signal.

According to embodiments of the present disclosure, the drive circuit 103 may determine the target candidate change frequency according to the image data transmission frequency of the application processor. The change frequency of the first drive control signal may be adjusted according to the target candidate change frequency, so as to obtain the second drive control signal. The second drive control signal may be used to drive the sub-pixel circuit to display the display data, so that the current display frequency of the display module may be matched with the image data transmission frequency. That is, the drive circuit 103 may obtain the second drive control signal whose change frequency is matched with the image data transmission frequency by adjusting the change frequency of the first drive control signal according to the target candidate change frequency. Since the second drive control signal may be used to drive the sub-pixel circuit of the display module to display the display data, the change frequency of the second drive control signal may be matched with the current display frequency of the display module. Therefore, the current display frequency of the display module matched with the image transmission frequency may be achieved.

According to embodiments of the present disclosure, in response to determining that the current display frequency is not matched with the image data transmission frequency, the drive circuit 103 may adjust the change frequency of the first drive control signal according to the image data transmission frequency, so as to obtain the second drive control signal.

According to embodiments of the present disclosure, the drive circuit 103 may determine whether the current display frequency is matched with the image data transmission frequency. In response to determining that the current display frequency is not matched with the image data transmission frequency, the drive circuit 103 may adjust the change frequency of the first drive control signal according to the image data transmission frequency of the application processor, so as to obtain the second drive control signal. In response to determining that the current display frequency is matched with the image data transmission frequency, an operation of adjusting the change frequency of the first drive control signal according to the image data transmission frequency of the application processor to obtain the second drive control signal may not be performed. The change frequency of the first drive control signal required to be adjusted may include at least one of a change frequency of the gate drive signal and a change frequency of the reset signal.

According to embodiments of the present disclosure, the current display frequency is adjusted according to the image data transmission frequency, which may achieve an effect that the current display frequency automatically changes with a rendering speed of the application processor.

According to embodiments of the present disclosure, in response to determining that the current display frequency is less than the image data transmission frequency, the drive circuit 103 may increase the change frequency of the first drive control signal according to the image data transmission frequency, so as to obtain the second drive control signal.

According to embodiments of the present disclosure, in response to determining that the current display frequency is greater than the image data transmission frequency, the drive circuit 103 may reduce the change frequency of the first drive control signal according to the image data transmission frequency, so as to obtain the second drive control signal.

For example, the image data transmission frequency is 90 Hz. The current display frequency is 80 Hz. The current response speed is 240 Hz. The display frequency is 240/N Hz. $N \in \{1, 2, 3, \ldots\}$, that is, the display frequency may be one of: 240 Hz, 120 Hz, 80 Hz, 60 Hz, 48 Hz, 40 Hz, 30 Hz, 24 Hz, . . . . The above-mentioned display frequencies may be used as candidate display frequencies.

The drive circuit 103 may determine that the current display frequency is less than the image data transmission frequency according to the image data transmission frequency and the current display frequency. Therefore, it is required to increase the current display frequency, that is, it is required to increase the change frequency of the first drive control signal. Since no candidate display frequency equal to the image data transmission frequency exists in at least one candidate display frequency, a target candidate display frequency that is greater than the image data transmission frequency and has a minimum absolute value of a difference value between the target candidate display frequency and the image data transmission frequency may be determined from the at least one candidate display frequency. Accordingly, the target candidate display frequency may be determined to be 120 Hz. The drive circuit 103 may increase the change frequency of the first drive control signal according to the target candidate display frequency, so as to obtain the second drive control signal.

For example, the image data transmission frequency is 90 Hz. The current display frequency is 80 Hz. The current response speed is 360 Hz. The display frequency is 360/N Hz. $N \in \{1, 2, 3, \ldots\}$, that is, the display frequency may be one of: 360 Hz, 180 Hz, 120 Hz, 90 Hz, 72 Hz, 60 Hz, 45 Hz, 40 Hz, 36 Hz, 30 Hz, 24 Hz, 20 Hz, 18 Hz, . . . . The above-mentioned display frequencies may be used as the candidate display frequencies.

The drive circuit 103 may determine that the current display frequency is less than the image data transmission frequency according to the image data transmission frequency and the current display frequency. Therefore, it is required to increase the current display frequency, that is, it is required to increase the change frequency of the first drive control signal. Since a candidate display frequency equal to the image data transmission frequency exists in the at least one candidate display frequency, a target candidate display frequency equal to the image data transmission frequency may be determined from the at least one candidate display frequency. Accordingly, the target candidate display frequency may be determined to be 90 Hz. The drive circuit 103 may increase the change frequency of the first drive control signal according to the target candidate display frequency, so as to obtain the second drive control signal.

For example, the image data transmission frequency is 80 Hz. The current display frequency is 90 Hz. The current response speed is 360 Hz. The display frequency is 360/N Hz. $N \in \{1, 2, 3, \ldots\}$, that is, the display frequency may be one of: 360 Hz, 180 Hz, 120 Hz, 90 Hz, 72 Hz, 60 Hz, 45 Hz, 40 Hz, 36 Hz, 30 Hz, 24 Hz, 20 Hz, 18 Hz, . . . . The above-mentioned display frequencies may be used as the candidate display frequencies.

The drive circuit 103 may determine that the current display frequency is greater than the image data transmission frequency according to the image data transmission frequency and the current display frequency. Therefore, it is required to reduce the current display frequency, that is, it is required to reduce the change frequency of the first drive control signal. Since no candidate display frequency equal to the image data transmission frequency exists in the at least one candidate display frequency, the target candidate display frequency that is greater than the image data transmission frequency and has the minimum absolute value of the difference value between the target candidate display frequency and the image data transmission frequency may be determined from the at least one candidate display frequency. Accordingly, the target candidate display frequency may be determined to be 90 Hz. Since the current display frequency is 90 Hz, and the current display frequency is equal to the target candidate display frequency, the drive circuit 103 may no longer perform the operation of adjusting the change frequency of the first drive control signal according to the image data transmission frequency of the application processor to obtain the second drive control signal.

For example, the image data transmission frequency is 80 Hz. The current display frequency is 90 Hz. The current response speed is 240 Hz. The display frequency is 240/N Hz. $N \in \{1, 2, 3, \ldots\}$, that is, the display frequency may be one of: 240 Hz, 120 Hz, 80 Hz, 60 Hz, 48 Hz, 40 Hz, 30 Hz, 24 Hz, . . . . The above-mentioned display frequencies may be used as the candidate display frequencies.

The drive circuit 103 may determine that the current display frequency is greater than the image data transmission frequency according to the image data transmission frequency and the current display frequency. Therefore, it is required to reduce the current display frequency, that is, it is required to reduce the change frequency of the first drive control signal. Since the candidate display frequency equal to the image data transmission frequency exists in the at least one candidate display frequency, the target candidate display frequency equal to the image data transmission frequency may be determined from the at least one candidate display frequency. Accordingly, the target candidate display frequency may be determined to be 80 Hz. The drive circuit 103 may reduce the change frequency of the first drive control signal according to the target candidate display frequency, so as to obtain the second drive control signal.

Figure 3A:
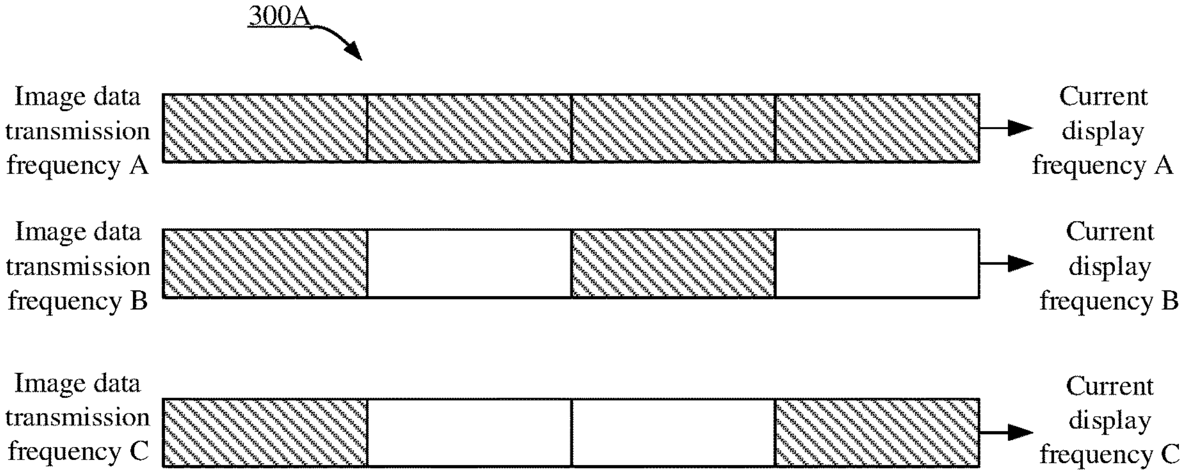
FIG. 3A schematically shows an exemplary schematic diagram of determining a current display frequency according to an image data transmission frequency according to an embodiment of the present disclosure.

FIG. 3A schematically shows an exemplary schematic diagram of determining a current display frequency according to an image data transmission frequency according to embodiments of the present disclosure.

As shown in FIG. 3A, in 300A, an image data transmission frequency B is greater than an image data transmission frequency C and less than an image data transmission frequency A. If the image data transmission frequency is the image data transmission frequency A, a current display frequency A that is matched with the image data transmission frequency A may be determined according to the image data transmission frequency A. If the image data transmission frequency is the image data transmission frequency B, a current display frequency B that is matched with the image data transmission frequency B may be determined according to the image data transmission frequency B. If the image data transmission frequency is the image data transmission frequency C, a current display frequency C that is matched with the image data transmission frequency C may be determined according to the image data transmission frequency C.

Figure 3B:
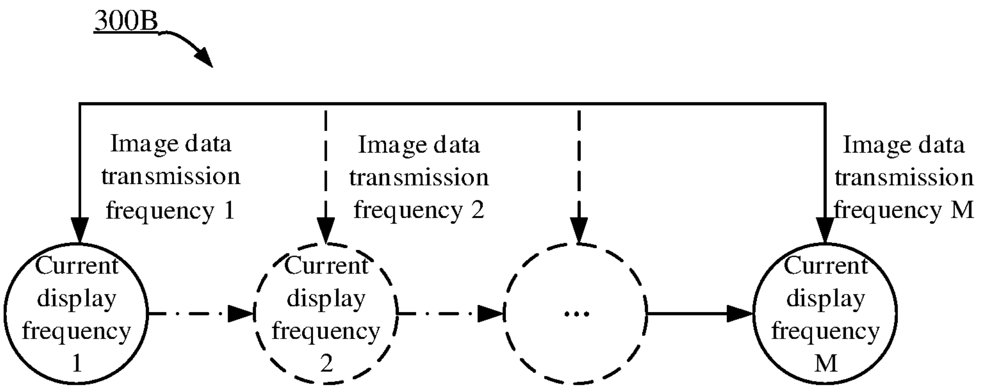
FIG. 3B schematically shows an exemplary schematic diagram of determining a current display frequency according to an image data transmission frequency according to another embodiment of the present disclosure.

FIG. 3B schematically shows an exemplary schematic diagram of determining a current display frequency according to an image data transmission frequency according to another embodiment of the present disclosure.

As shown in FIG. 3B, in 300B, "dotted line" sections may indicate that it is determined that the current display frequency needs to be reduced according to the image data transmission frequency and the current display frequency. "Solid line" sections may indicate that it is determined that the current display frequency needs to be increased according to the image data transmission frequency and the current display frequency.

For example, it is determined that the current display frequency needs to be increased according to an image data transmission frequency 1 and the current display frequency, so as to obtain a current display frequency 1. It is determined that the current display frequency 1 needs to be reduced according to an image data transmission frequency 2 and the current display frequency 1, so as to obtain a current display frequency 2 . . . . It is determined that a current display frequency M−1 needs to be increased according to an image data transmission frequency M and the current display frequency M−1, so as to obtain a current display frequency M. M may be a number greater than 0.

According to embodiments of the present disclosure, the drive circuit 103 may determine display frequency adjustment information in response to receiving a display frequency adjustment request from the application processor, and adjust the change frequency of the first drive control signal according to the display frequency adjustment information to obtain a third drive control signal. The third drive control signal may be used to drive the sub-pixel circuit to display the display data.

According to embodiments of the present disclosure, the display frequency adjustment request may refer to a request for adjusting the display frequency. The display frequency adjustment request may include the display frequency adjustment information. The display frequency adjustment information may include a display frequency range. The display frequency range may be obtained by one of methods that: the display frequency range may be preset; and the display frequency range may be determined by the application processor according to attribute information of a current application.

According to embodiments of the present disclosure, the application processor may generate the display frequency adjustment request according to the display frequency adjustment information. The application processor may send the display frequency adjustment request to the drive circuit 103. The drive circuit 103 may analyze the display frequency adjustment request to obtain the display frequency adjustment information in response to receiving the display frequency adjustment request from the application processor.

According to embodiments of the present disclosure, after obtaining the display frequency adjustment information, the drive circuit 103 may adjust the change frequency of the first drive control signal according to the display frequency adjustment information, so as to obtain the third drive control signal.

According to embodiments of the present disclosure, the display frequency adjustment information may include a first display frequency range corresponding to the current application. The first display frequency range may be determined by the application processor according to the attribute information of the current application.

According to embodiments of the present disclosure, the attribute information may include an application type. The application type may refer to a type of an application itself. The type of the application itself may be determined according to an application identity of the application. In addition, the application type may also refer to a type determined according to a function provided by the application. The function provided by the application may include at least one of: a game, a social contact, a shopping, a video, an audio and a text. The application type may include at least one of: a game type, a social contact type, a shopping type, a video type, an audio type and a text type.

According to embodiments of the present disclosure, the application may have a display frequency range corresponding to the application. For example, for the current application, the application processor may determine the first display frequency range of the current application according to the attribute information of the current application. The first display frequency range may be determined according to a first display frequency and a second display frequency. The first display frequency may be greater than the second display frequency. The first display frequency may be the highest display frequency in the first display frequency range. The second display frequency may be the lowest display frequency in the first display frequency range. In addition, the display frequency may have a display frequency level corresponding to the display frequency.

For example, the current application is “Xxx”. “xx” may represent the application identity. A function provided by the current application is a game. An application type of the current application may be determined as “xx” according to the application identify. Alternatively, since the function provided by the current application is the game, it may be determined that the application type of the current application may be a game type. A first display frequency range corresponding to the current application “xx” may be greater than or equal to 120 Hz and less than or equal to 240 Hz.

For example, the current application is “*” may represent an application identity. A function provided by the current application is a social contact. An application type of the current application may be determined as “” according to the application identify. Alternately, since the function provided by the current application is the social contact, it may be determined that the application type of the current application may be a social contact type. A first display frequency range corresponding to the current application “” may be greater than or equal to 80 Hz and less than or equal to 120 Hz.

According to embodiments of the present disclosure, the application processor may determine the first display frequency range corresponding to the current application according to the attribute information of the current application, the application processor sends the first display frequency range to the drive circuit, and the drive circuit adjusts the current display frequency of the display module according to the first display frequency range, so that the current display frequency of the display module may be matched with a required display frequency of the current application. Accordingly, a power consumption of the display module may be reduced.

According to embodiments of the present disclosure, the display frequency adjustment information may include a preset second display frequency range.

According to embodiments of the present disclosure, the second display frequency range may be preset. Different from the first display frequency range, the current application may not be distinguished, and each current application has a same second display frequency range.

Figure 4:
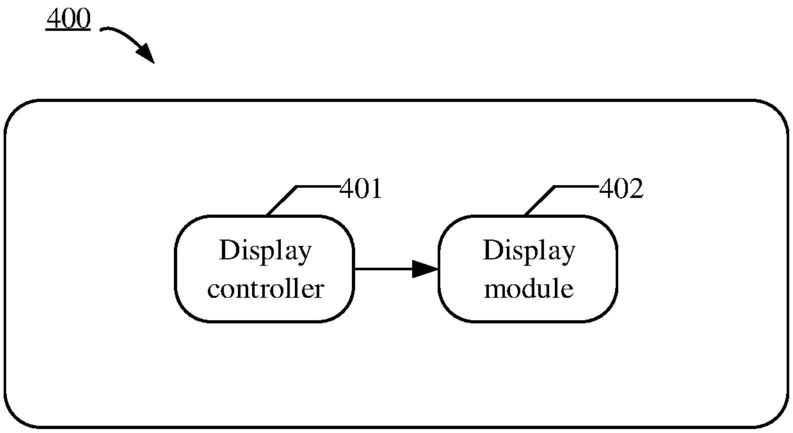
FIG. 4 schematically shows a block diagram of a display device according to an embodiment of the present disclosure.

FIG. 4 schematically shows a block diagram of a display device according to an embodiment of the present disclosure.

As shown in FIG. 4, a display device 400 may include a display controller 401 and a display module 402. The display controller 401 may be connected to the display module 402.

The display controller 401 may be the display controller 100 according to embodiments of the present disclosure.

The display module 402 may be used to display the display data according to a drive control signal provided by the display controller 401. The display data may be determined according to the second current image data.

The display device according to embodiments of the present disclosure will be further described below with reference to FIG. 5 and specific embodiments.

Figure 5:
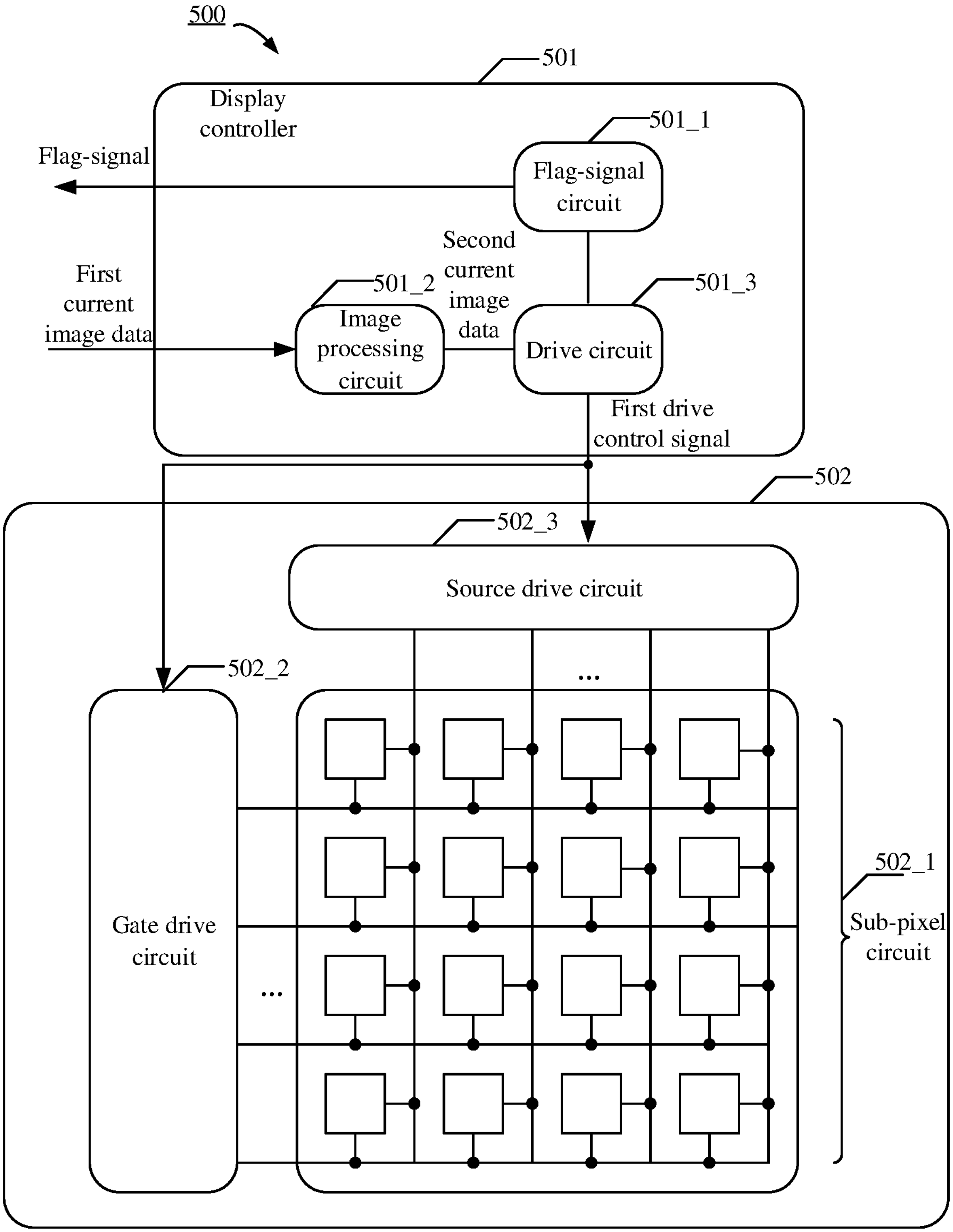
FIG. 5 schematically shows a block diagram of a display device according to another embodiment of the present disclosure.

FIG. 5 schematically shows a block diagram of a display device according to another embodiment of the present disclosure.

As shown in FIG. 5, a display device 500 may include a display controller 501 and a display module 502.

The display controller 501 may include a flag-signal circuit 501_1, an image processing circuit 501_2, and a drive circuit 501_3. The drive circuit 501_3 may be connected to the flag-signal circuit 501_1 and the image processing circuit 501_2.

The display module 502 may include a sub-pixel circuit 502_1, a gate drive circuit 502_2 and a source drive circuit 502_3. The gate drive circuit 502_2 may be connected to the sub-pixel circuit 502_1 and the display controller 501. The source drive circuit 502_3 may be connected to the sub-pixel circuit 502_1 and the display controller 501.

The sub-pixel circuit 502_1 is provided.

The gate drive circuit 502_2 may provide a scan start signal, a gate drive signal and a reset signal to the sub-pixel circuit 502_1 according to a first drive control signal sent by the display controller 501.

The source drive circuit 502_3 may provide a data signal to the sub-pixel circuit 502_1 according to the first drive control signal sent by the display controller 501. The scan start signal, the gate drive signal, the reset signal and the data signal may be used to drive the sub-pixel circuit 502_1 to display the display data.

According to embodiments of the present disclosure, the drive control signal may include the scan start signal, the gate drive signal, the reset signal and the data signal. In addition, the drive control signal may further include a light-emitting signal. The sub-pixel circuit 502_1 may include R×S sub-pixels. The R×S sub-pixels are arranged as an R×S array. R and S may be integers greater than 1.

According to embodiments of the present disclosure, the change frequency of the scan start signal may be used as an anode reset frequency of the sub-pixel circuit.

According to embodiments of the present disclosure, a reset signal of a T7 transistor in the sub-pixel circuit 502_1 may be independent and independently driven by the scan start signal without being affected by a display frequency. Accordingly, the change frequency of the scan start signal may be used as the anode reset frequency of the sub-pixel circuit. A type of the sub-pixel circuit 502_1 may include one of: 7TIC, 8TIC, and 9TIC. In addition, the type of the sub-pixel circuit 502_1 may also include other types, which will not be limited here.

Figure 6A:
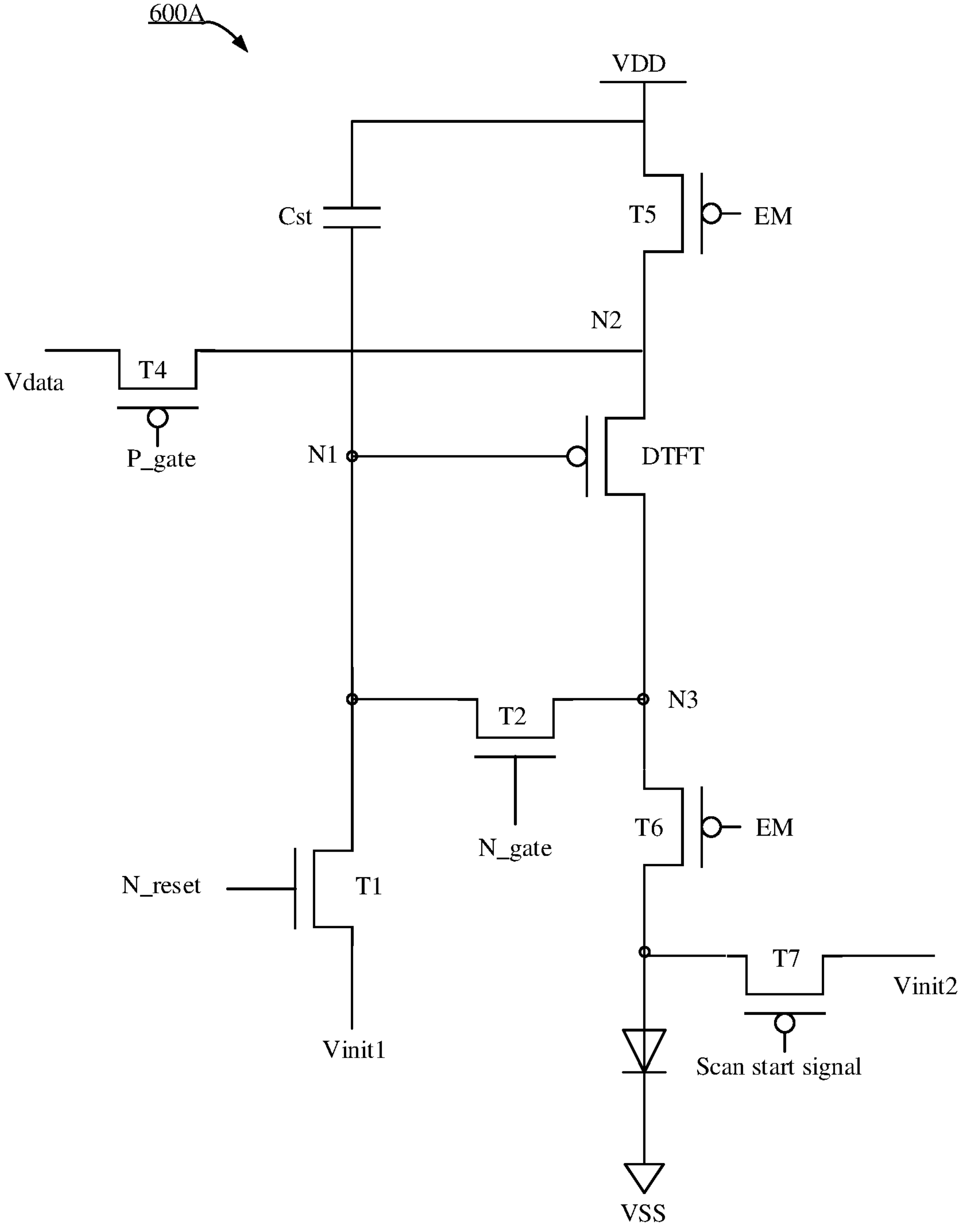
FIG. 6A schematically shows a schematic diagram of a circuit structure of a sub-pixel circuit according to an embodiment of the present disclosure.

FIG. 6A schematically shows a schematic diagram of a circuit structure of a sub-pixel circuit according to an embodiment of the present disclosure.

As shown in FIG. 6A, a reset signal of a T7 transistor in the 7TIC may be independent from a sub-pixel circuit 600A and independently driven by the scan start signal. Other structures are the same as a structure of the 7TIC, which will not be repeated here.

Figure 6B:
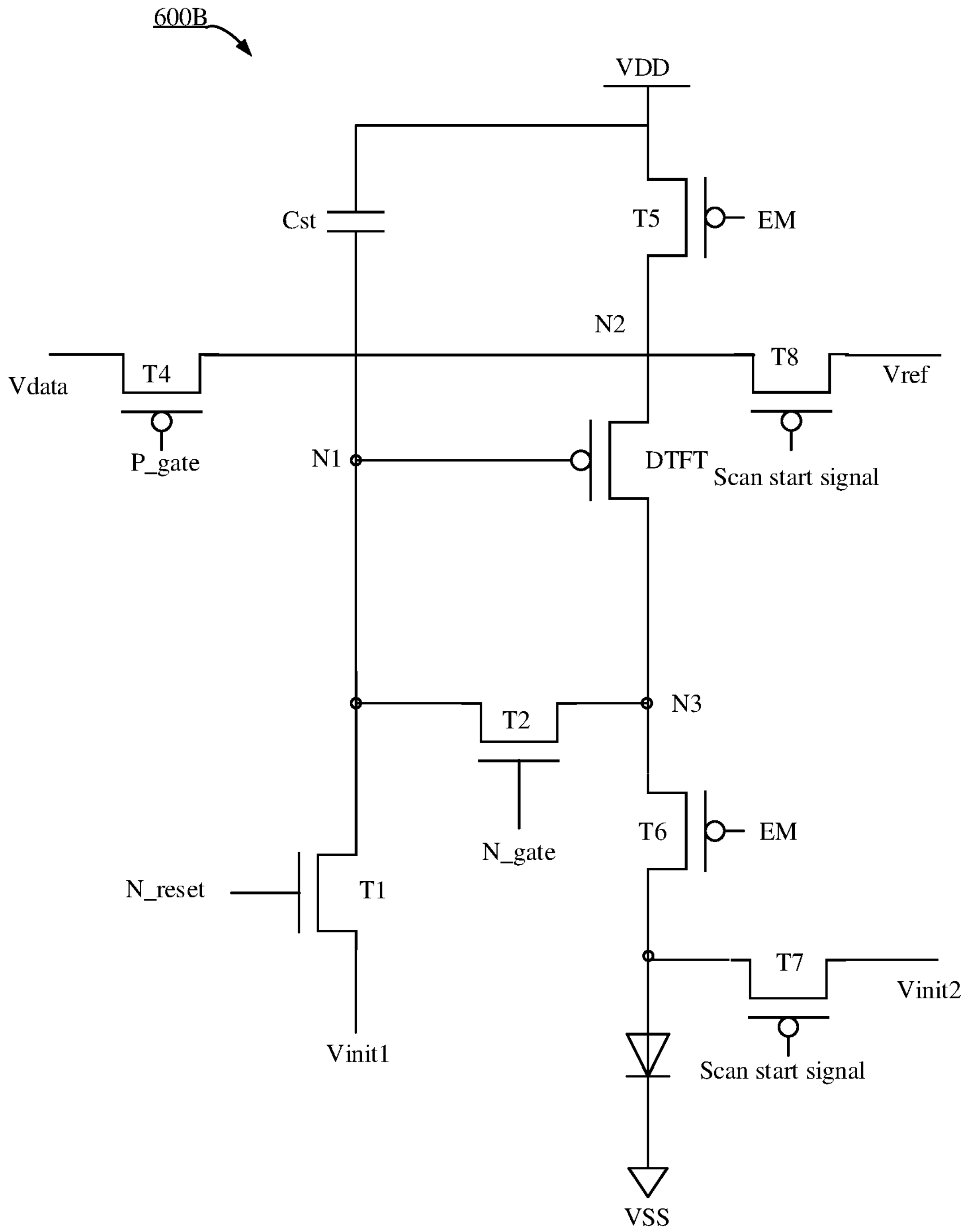
FIG. 6B schematically shows a schematic diagram of a circuit structure of a sub-pixel circuit according to another embodiment of the present disclosure.

FIG. 6B schematically shows a schematic diagram of a circuit structure of a sub-pixel circuit according to another embodiment of the present disclosure.

As shown in FIG. 6B, a reset signal of a T7 transistor in the 8TIC may be independent from a sub-pixel circuit 600B and independently driven by the scan start signal. In addition, the scan start signal may also be shared with a reset signal of a T8 transistor. A change frequency of the reset signal of the T8 transistor may change with the change frequency of the scan start signal. Other structures are the same as a structure of the 8TIC, which will not be repeated here.

Figure 6C:
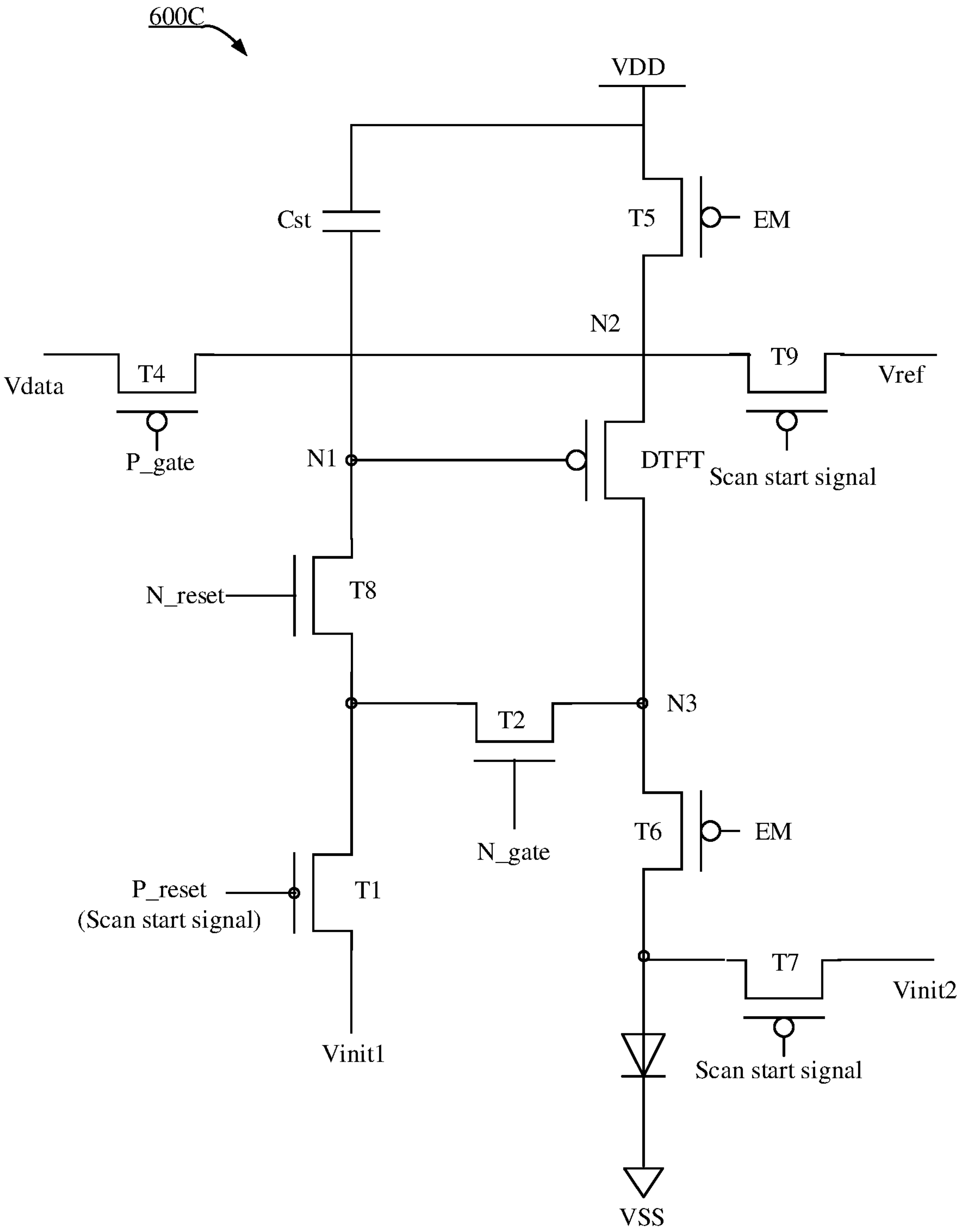
FIG. 6C schematically shows a schematic diagram of a circuit structure of a sub-pixel circuit according to another embodiment of the present disclosure.

FIG. 6C schematically shows a schematic diagram of a circuit structure of a sub-pixel circuit according to another embodiment of the present disclosure.

As shown in FIG. 6C, a reset signal of a T7 transistor in the 9TIC may be independent from a sub-pixel circuit 600C and independently driven by the scan start signal. In addition, the scan start signal may also be shared with reset signals of T8 and T9 transistors. Change frequencies of the reset signals of the T8 and T9 transistors may change with the change frequency of the scan start signal. Other structures are the same as a structure of the 9TIC, which will not be repeated here.

Figure 7:
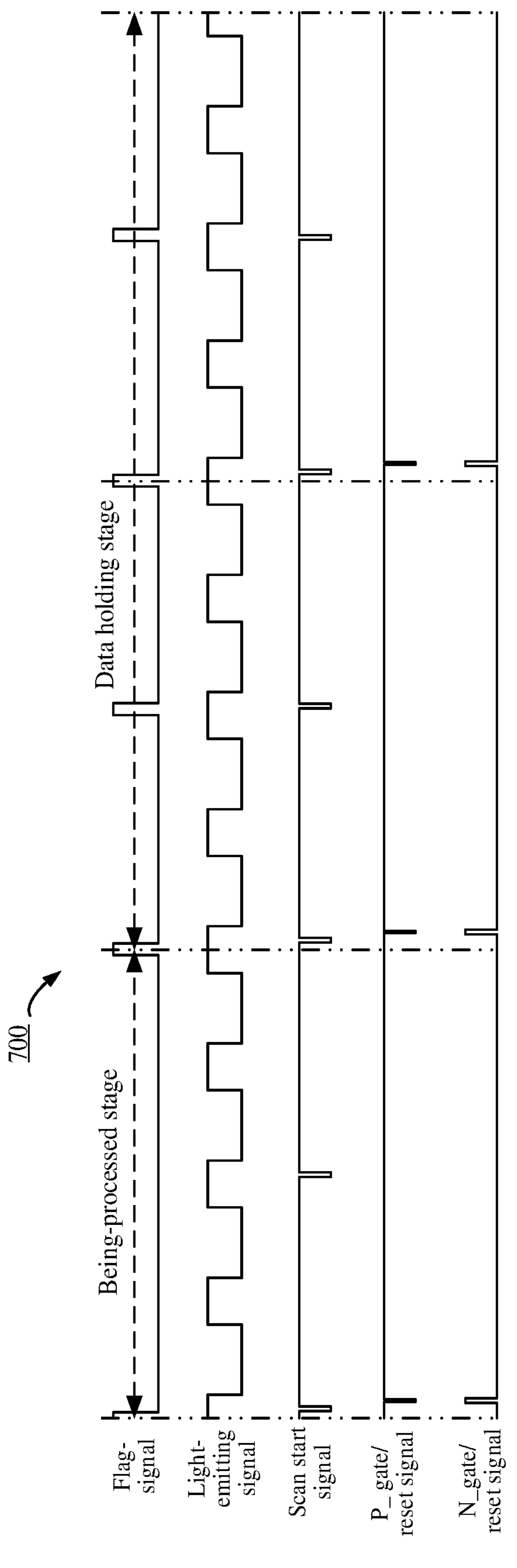
FIG. 7 schematically shows a signal timing diagram of a display device according to an embodiment of the present disclosure.

FIG. 7 schematically shows a signal timing diagram of a display device according to an embodiment of the present disclosure.

As shown in FIG. 7, in 700, a P_gate/reset signal may refer to a gate drive signal and a reset signal of a P electrode. An N_gate/reset signal may refer to a gate drive signal and a reset signal of an N electrode.

A change frequency of the light-emitting signal is 480 Hz. The change frequency of the scan start signal is 240 Hz. When the data processing stage is the being-processed stage, the change frequency of the flag-signal is 120 Hz. When the data processing stage is the data holding stage, the change frequency of the flag-signal is 240 Hz.

The current response speed of the display module is consistent with the change frequency of the scan start signal, that is, the current response speed of the display module is 240 Hz. The current display frequency of the display module is consistent with change frequencies of the P_gate/reset signal and the N_gate/reset signal, that is, the current display frequency of the display module is 120 Hz. It should be noted that the light-emitting signal and the scan start signal are displayed at a constant predetermined frequency, and the P_gate/reset signal and the N_gate/reset signal are kept to be consistent with the current display frequency of the display module.

If the current display frequency of the display module needs to be adjusted, a display frequency sharing the same group of Gammas may be 240/N Hz. If the change frequency of the scan start signal is increased to 360 Hz, the display frequency sharing the same group of Gammas may be 360/N Hz. A granularity of a frequency adjustment may be further refined, and the current response speed of the display module may also reach 360 Hz. N may be an integer greater than or equal to 1.

Figure 8:
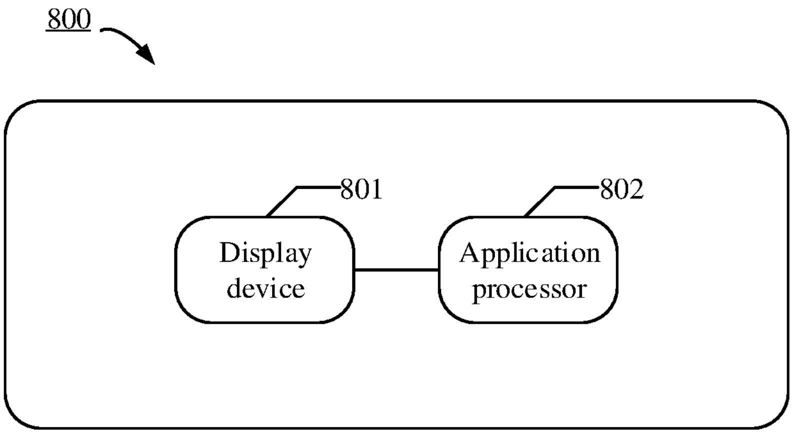
FIG. 8 schematically shows a block diagram of a display system according to an embodiment of the present disclosure.

FIG. 8 schematically shows a block diagram of a display system according to an embodiment of the present disclosure.

As shown in FIG. 8, a display system 800 may include a display device 801 and an application processor 802. The display device 801 may be connected to the application processor 802.

The display device 801 may be the display device according to embodiments of the present disclosure.

The application processor 802 may send first current image data to an image processing circuit in response to receiving a flag-signal from a flag-signal circuit.

According to embodiments of the present disclosure, the application processor 802 may send a display frequency adjustment request to a drive circuit, so that the drive circuit may determine display frequency adjustment information in response to receiving the display frequency adjustment request from the application processor 802, and adjust a change frequency of a first drive control signal according to the display frequency adjustment information to obtain a third drive control signal. The third drive control signal may be used to drive a sub-pixel circuit to display the display data.

According to embodiments of the present disclosure, the application processor 802 may send a display frequency adjustment request to a drive circuit, so that the drive circuit may determine a display frequency adjustment information in response to receiving the display frequency adjustment request from the application processor 802, and adjust a change frequency of a first drive control signal according to the display frequency adjustment information to obtain a third drive control signal. The third drive control signal may be used to drive a sub-pixel circuit to display the display data.

According to embodiments of the present disclosure, the display frequency adjustment information may include a first display frequency range corresponding to a current application. The first display frequency range may be determined by the application processor 802 according to attribute information of the current application.

According to embodiments of the present disclosure, the display frequency adjustment information may include a preset second display frequency range.

Figure 9:
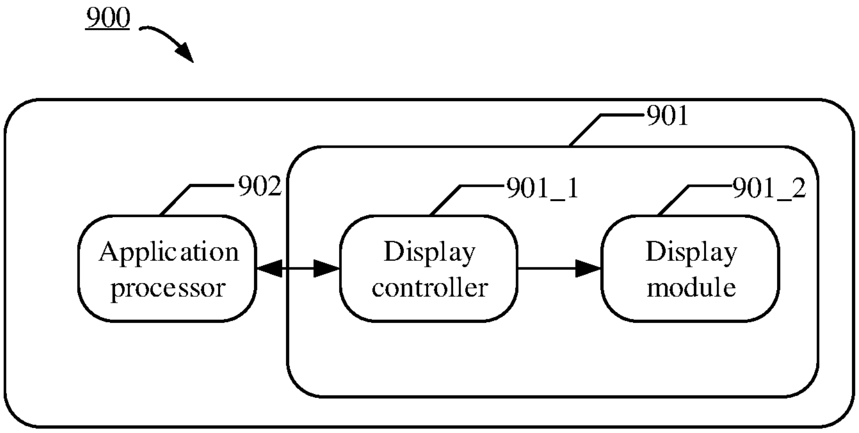
FIG. 9 schematically shows a block diagram of a display system according to another embodiment of the present disclosure.

FIG. 9 schematically shows a block diagram of a display system according to another embodiment of the present disclosure.

As shown in FIG. 9, a display system 900 may include a display device 901 and an application processor 902. The display device 900 may include a display controller 901_1 and a display module 901_2.

The display controller 901_1 may send a flag-signal to the application processor 902, and obtain second current image data according to first current image data in response to receiving the first current image data from the application processor 902. The first current image data is sent by the application processor 902 in response to receiving the flag-signal sent from the display controller 901_1. The display controller 901_1 may generate a first drive control signal according to the second current image data. The first drive control signal may be used to drive a sub-pixel circuit included in the display module 901_2 to display the display data.

Figure 10:
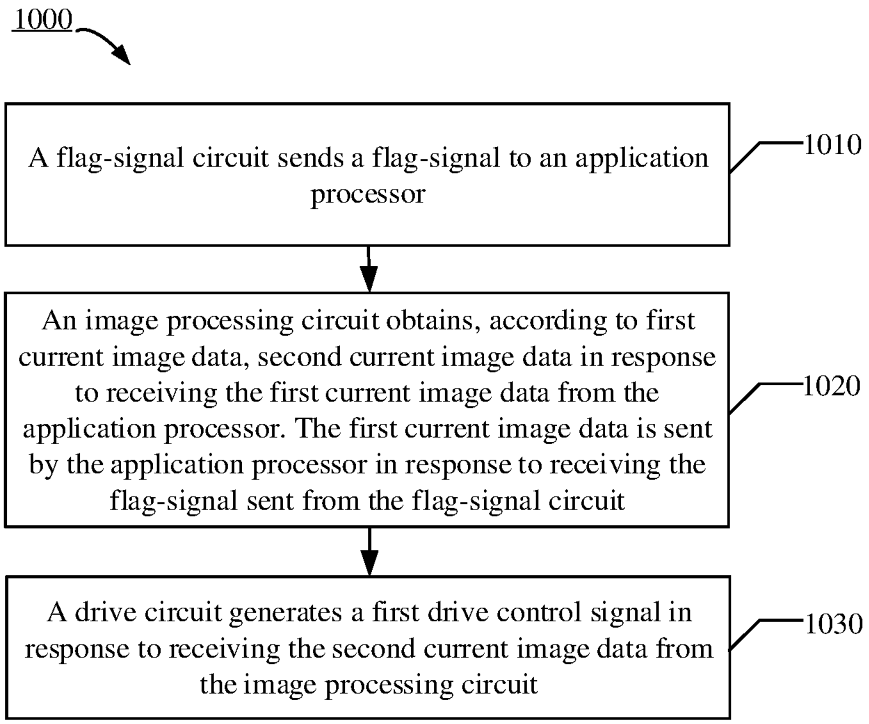
FIG. 10 schematically shows a flowchart of a control method of a display controller according to an embodiment of the present disclosure.

FIG. 10 schematically shows a flowchart of a control method of a display controller according to an embodiment of the present disclosure.

As shown in FIG. 10, a method 1000 includes operations S1010 to S1030.

In operation S1010, a flag-signal circuit sends a flag-signal to an application processor.

In operation S1020, an image processing circuit obtains second current image data in response to receiving first current image data from the application processor. The first current image data is sent by the application processor in response to receiving the flag-signal sent from the flag-signal circuit.

In operation S1030, a drive circuit generates a first drive control signal in response to receiving the second current image data from the image processing circuit.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Embodiments of the present disclosure have been described above. However, these embodiments are for illustrative purposes only, and are not used to limit the scope of the present disclosure. Although embodiments are described separately above, this does not mean that the measures in embodiments may not be used advantageously in combination. The scope of the present disclosure is defined by the appended claims and their equivalents. Without departing from the spirit and principles of the present disclosure, those skilled in the art may make various alternatives and equivalent substitutions, and these alternatives and modifications should all fall within the scope of the present disclosure.

What is claimed is:

1. A display controller, comprising:

a flag-signal circuit configured to send a flag-signal to an application processor;

an image processing circuit configured to obtain second current image data in response to receiving first current image data from the application processor, wherein the first current image data is sent by the application processor in response to receiving the flag-signal sent from the flag-signal circuit; and a drive circuit configured to generate a first drive control signal in response to receiving the second current image data from the image processing circuit, wherein the flag-signal circuit is further configured to send the flag-signal loaded with a first pulse signal to the application processor, and the flag-signal loaded with the first pulse signal is configured to indicate that the application processor is allowed to send the first current image data to the image processing circuit, wherein the image processing circuit is further configured to obtain, according to the first current image data, the second current image data in response to receiving the first current image data from the application processor, and the first current image data is sent by the application processor in response to receiving the flag-signal loaded with the first pulse signal, which is sent from the flag-signal circuit, wherein the first drive control signal comprises a scan start signal loaded with a second pulse signal, wherein the drive circuit is further configured to generate the scan start signal loaded with the second pulse signal in response to detecting that previous image data from the application processor is processed, and wherein the flag-signal circuit is further configured to generate the flag-signal loaded with the first pulse signal in response to receiving the scan start signal loaded with the second pulse signal from the drive circuit.

2. The display controller according to claim 1, wherein a change frequency of the flag-signal loaded with the first pulse signal is consistent with a change frequency of the scan start signal; and a current response speed of a display module is consistent with the change frequency of the scan start signal.

3. The display controller according to claim 1, wherein the drive circuit is configured to adjust a change frequency of the first drive control signal according to an image data transmission frequency of the application processor, so as to obtain a second drive control signal, wherein the second drive control signal is configured to drive a sub-pixel circuit comprised in a display module to display display data, and a change frequency of the second drive control signal is matched with the image data transmission frequency.

4. The display controller according to claim 3, wherein the drive circuit is configured to adjust, in response to determining that a current display frequency is not matched with the image data transmission frequency, the change frequency of the first drive control signal according to the image data transmission frequency, so as to obtain the second drive control signal.

5. The display controller according to claim 4, wherein the drive circuit is configured to increase, in response to determining that the current display frequency is less than the image data transmission frequency, the change frequency of the first drive control signal according to the image data transmission frequency, so as to obtain the second drive control signal.

6. The display controller according to claim 4, wherein the drive circuit is configured to reduce, in response to determining that the current display frequency is greater than the image data transmission frequency, the change frequency of the first drive control signal according to the image data transmission frequency, so as to obtain the second drive control signal.

7. The display controller according to claim 1, wherein the drive circuit is configured to determine display frequency adjustment information in response to receiving a first display frequency adjustment request from the application processor, and adjust a change frequency of the first drive control signal according to the display frequency adjustment information to obtain a third drive control signal, wherein the third drive control signal is configured to drive a sub-pixel circuit comprised in a display module to display display data.

8. The display controller according to claim 7, wherein the display frequency adjustment information comprises a first display frequency range corresponding to a current application, and the first display frequency range is determined by the application processor according to attribute information of the current application.

9. The display controller according to claim 7, wherein the display frequency adjustment information comprises a preset second display frequency range.

10. The display controller according to claim 1, wherein the first drive control signal is configured to drive a sub-pixel circuit comprised in a display module to display display data, wherein the display data is determined according to the second current image data, and a current response speed of the display module is N times of a current display frequency of the display module, wherein Nis an integer greater than or equal to 1.

11. A display device, comprising:

the display controller according to claim 1; and a display module connected to the display controller, wherein the display module is configured to display display data according to a drive control signal provided by the display controller, wherein the display data is determined according to the second current image data.

12. The display device according to claim 11, wherein the display module comprises:

a sub-pixel circuit;

a gate drive circuit connected to the display controller and the sub-pixel circuit, wherein the gate drive circuit is configured to provide a scan start signal, a gate drive signal, and a reset signal to the sub-pixel circuit according to the first drive control signal sent by the display controller; and a source drive circuit connected to the display controller and the sub-pixel circuit, wherein the source drive circuit is configured to provide a data signal to the sub-pixel circuit according to the first drive control signal sent by the display controller, wherein the gate drive signal, the reset signal, and the data signal are configured to drive the sub-pixel circuit to display the display data.

13. The display device according to claim 12, wherein a change frequency of the scan start signal is configured as an anode reset frequency of the sub-pixel circuit.

14. A display system, comprising:

the display device according to claim 11; and an application processor configured to send the first current image data to the image processing circuit in response to receiving the flag-signal from the flag-signal circuit.

15. The display system according to claim 14, wherein the application processor is configured to send a display frequency adjustment request to the drive circuit, so that the drive circuit determines display frequency adjustment information in response to receiving the display frequency adjustment request from the application processor, and adjusts a change frequency of the first drive control signal according to the display frequency adjustment information to obtain a third drive control signal, wherein the third drive control signal is configured to drive a sub-pixel circuit to display the display data.

16. The display system according to claim 15, wherein the display frequency adjustment information comprises a first display frequency range corresponding to a current application, and the first display frequency range is determined by the application processor according to attribute information of the current application.

17. The display system according to claim 15, wherein the display frequency adjustment information comprises a preset second display frequency range.

18. A control method applied to a display controller, wherein the display controller comprises:

a flag-signal circuit configured to send a flag-signal to an application processor;

an image processing circuit configured to obtain second current image data in response to receiving first current image data from the application processor, wherein the first current image data is sent by the application processor in response to receiving the flag-signal sent from the flag-signal circuit; and a drive circuit configured to generate a first drive control signal in response to receiving the second current image data from the image processing circuit, wherein the flag-signal circuit is further configured to send the flag-signal loaded with a first pulse signal to the application processor, and the flag-signal loaded with the first pulse signal is configured to indicate that the application processor is allowed to send the first current image data to the image processing circuit, wherein the image processing circuit is further configured to obtain, according to the first current image data, the second current image data in response to receiving the first current image data from the application processor, and the first current image data is sent by the application processor in response to receiving the flag-signal loaded with the first pulse signal, which is sent from the flag-signal circuit, wherein the first drive control signal comprises a scan start signal loaded with a second pulse signal, wherein the drive circuit is further configured to generate the scan start signal loaded with the second pulse signal in response to detecting that previous image data from the application processor is processed, wherein the flag-signal circuit is further configured to generate the flag-signal loaded with the first pulse signal in response to receiving the scan start signal loaded with the second pulse signal from the drive circuit, and wherein the control method comprises:

sending, by the flag-signal circuit, the flag-signal to the application processor;

obtaining, by the image processing circuit, the second current image data in response to receiving the first current image data from the application processor, wherein the first current image data is sent by the application processor in response to receiving the flag-signal sent from the flag-signal circuit; and generating, by the drive circuit, the first drive control signal in response to receiving the second current image data from the image processing circuit.

* * * * *